(12) United States Patent
Koase

(10) Patent No.: US 9,085,173 B2
(45) Date of Patent: Jul. 21, 2015

(54) INK JET RECORDING METHOD AND RECORDING APPARATUS

(71) Applicant: Seiko Epson Corporation, Tokyo (JP)

(72) Inventor: Takashi Koase, Shiojiri (JP)

(73) Assignee: Seiko Epson Corporation (JP)

( * ) Notice: Subject to any disclaimer, the term of this patent is extended or adjusted under 35 U.S.C. 154(b) by 294 days.

(21) Appl. No.: 13/738,398

(22) Filed: Jan. 10, 2013

(65) Prior Publication Data
US 2013/0182057 A1 Jul. 18, 2013

(30) Foreign Application Priority Data

Jan. 13, 2012 (JP) ................................. 2012-005375
Apr. 4, 2012 (JP) ................................. 2012-085202

(51) Int. Cl.
| | |
|---|---|
| *B41J 2/01* | (2006.01) |
| *B41J 11/00* | (2006.01) |
| *C09D 11/322* | (2014.01) |
| *C09D 11/40* | (2014.01) |
| *B41J 2/21* | (2006.01) |

(52) U.S. Cl.
CPC ............. *B41J 11/002* (2013.01); *C09D 11/322* (2013.01); *C09D 11/40* (2013.01); *B41J 2/2107* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00

USPC ......... 347/100, 95, 96, 102, 101, 88, 103, 99, 347/20, 21, 9; 106/31.6, 31.13, 31.27; 523/160, 161
See application file for complete search history.

(56) References Cited

U.S. PATENT DOCUMENTS

| | | | | |
|---|---|---|---|---|
| 6,699,352 | B2 * | 3/2004 | Sawatsky ....................... | 156/277 |
| 2004/0239738 | A1 * | 12/2004 | Watanabe ...................... | 347/100 |
| 2005/0190248 | A1 * | 9/2005 | Konno et al. .................. | 347/102 |
| 2009/0244146 | A1 * | 10/2009 | Chiwata .......................... | 347/14 |
| 2011/0234680 | A1 * | 9/2011 | Aoyama et al. ................. | 347/20 |

FOREIGN PATENT DOCUMENTS

| | | |
|---|---|---|
| JP | 2010-221634 | 10/2010 |
| JP | 2011-126125 | 6/2011 |

* cited by examiner

*Primary Examiner* — Manish S Shah
(74) *Attorney, Agent, or Firm* — Harness, Dickey & Pierce, P.L.C.

(57) ABSTRACT

An ink jet recording method includes using at least a first ink composition containing a color material and a second ink composition containing a resin as well as substantially not containing a color material, including: a first recording step recording the first ink composition onto a medium to be recorded; a second recording step recording the second ink composition onto the image; a second drying step of drying the image at a first temperature, which is performed during execution of the second recording step or thereafter; and a third drying step of drying the image at a second temperature which exceeds the first temperature after the second drying step; in which, the second ink composition does not substantially contain an aprotic polar solvent, and the heat deformation temperature of the resin exceeds the first temperature and is lower than the second temperature.

15 Claims, 7 Drawing Sheets

FIG. 5

| | | COMPOSITION 1 | COMPOSITION 2 | COMPOSITION 3 | COMPOSITION 4 | COMPOSITION 5 | COMPOSITION 6 | COMPOSITION 7 | COMPOSITION 8 | COMPOSITION 9 | COMPOSITION 10 | COMPOSITION 11 |
|---|---|---|---|---|---|---|---|---|---|---|---|---|
| COLOR MATERIAL | PIGMENT | - | - | - | - | - | - | - | - | - | 3 | 3 |
| RESIN EMULSION | MOWINYL 972 | 14 | - | - | - | 14 | - | - | - | - | 2 | 2 |
| | MOWINYL 6530 | - | 15.9 | - | - | - | 15.9 | - | - | 15.9 | - | - |
| | MOWINYL 742A | - | - | 15.2 | - | - | - | 15.2 | - | - | - | - |
| | VINYBLAN 2500E | - | - | - | 20 | - | - | - | 20 | - | - | - |
| 12AD | 1,2-HEXANEDIOL | - | - | - | - | - | - | - | - | 5 | 5 | 5 |
| ORGANIC SOLVENT | 2-PYRROLIDONE | - | - | - | - | 20 | 20 | 20 | 20 | 20 | 15 | - |
| | BUTYLENEGLYCOL | 20 | 20 | 20 | 20 | - | - | - | - | - | 10 | 10 |
| SURFACTANT | BYK348 | 0.5 | 0.5 | 0.5 | 0.5 | 0.5 | 0.5 | 0.5 | 0.5 | 0.5 | 0.5 | 0.5 |
| WATER | PURE WATER | RESIDUE | RESIDUE | RESIDUE | RESIDUE | RESIDUE | RESIDUE | RESIDUE | RESIDUE | RESIDUE | RESIDUE | RESIDUE |
| TOTAL | | 100 | 100 | 100 | 100 | 100 | 100 | 100 | 100 | 100 | 100 | 100 |
| INK FILM FORMATION TEMPERATURE (°C) | | APPROXIMATELY 100 | APPROXIMATELY 70 | APPROXIMATELY 50 | APPROXIMATELY 35 | - | - | - | - | - | - | - |

FIG. 6

| RESIN EMULSION | MFT (°C) | REDISPERSIBILITY EVALUATION | |
| --- | --- | --- | --- |
| | | ORGANIC SOLVENT: 2-PYRROLIDONE | ORGANIC SOLVENT: UTYLENEGLYCOL |
| MOWINYL 972 | 105 | COMPOSITION 5 <br> × | COMPOSITION 1 <br> ○ |
| MOWINYL 6530 | 70 | COMPOSITION 6 <br> × | COMPOSITION 2 <br> ○ |
| MOWINYL 742A | 50 | COMPOSITION 7 <br> × | COMPOSITION 3 <br> × |
| MOWINYL 2500E | 35 | COMPOSITION 8 <br> × | COMPOSITION 4 <br> × |

FIG. 7

| CLEAR PRINT RECORDING METHOD | TOTAL INK APPLICATION AMOUNT (mg/inch$^2$) | PRINT RESOLUTION (dpi) | NUMBER OF PASSES | INK EJECTION AMOUNT (ng) |
| --- | --- | --- | --- | --- |
| METHOD 1 | 43.5 | 720 X 720 | 4 | 21 |
| METHOD 2 | 43.5 | 720 X 1440 | 8 | 21 |
| METHOD 3 | 21.8 | 720 X 720 | 4 | 21 |

FIG. 8

| | TEST EXAMPLE | EXAMPLE 1 | EXAMPLE 2 | EXAMPLE 3 | EXAMPLE 4 |
|---|---|---|---|---|---|
| COATING METHOD | — | METHOD 1 | METHOD 1 | METHOD 2 | METHOD 3 |
| RECORDING CONDITIONS | — | 720×720 4 PASS NOZZLES 2 ROWS 2 LAYERS | 720×720 4 PASS NOZZLES 2 ROWS 2 LAYERS | 720×1440 8 PASS NOZZLES 2 ROWS 1 LAYERS | 720×720 4 PASS NOZZLES 2 ROWS 1 LAYER |
| SECOND INK / FIRST INK | NO CLEAR INK | COMPOSITION 2 | COMPOSITION 1 | COMPOSITION 2 | COMPOSITION 2 |
| PLAIN | 60.7 | 73.4 | 68.1 | 64.3 | 64.2 |
| BLACK | 12.8 | 69.5 | 67.5 | 55 | 31 |
| CYAN | 2.6 | 54.2 | 50.8 | 25.7 | 20.9 |
| MAGENTA | 28.8 | 67.9 | 65.9 | 44.4 | 42.8 |
| YELLOW | 16.1 | 65.8 | 61.6 | 52 | 38.3 |
| COMPOSITE | 11.3 | 63.8 | 57.5 | 41.3 | 33.3 |
| AVERAGE GLOSSINESS | 22.1 | 65.8 | 61.9 | 47.1 | 38.4 |

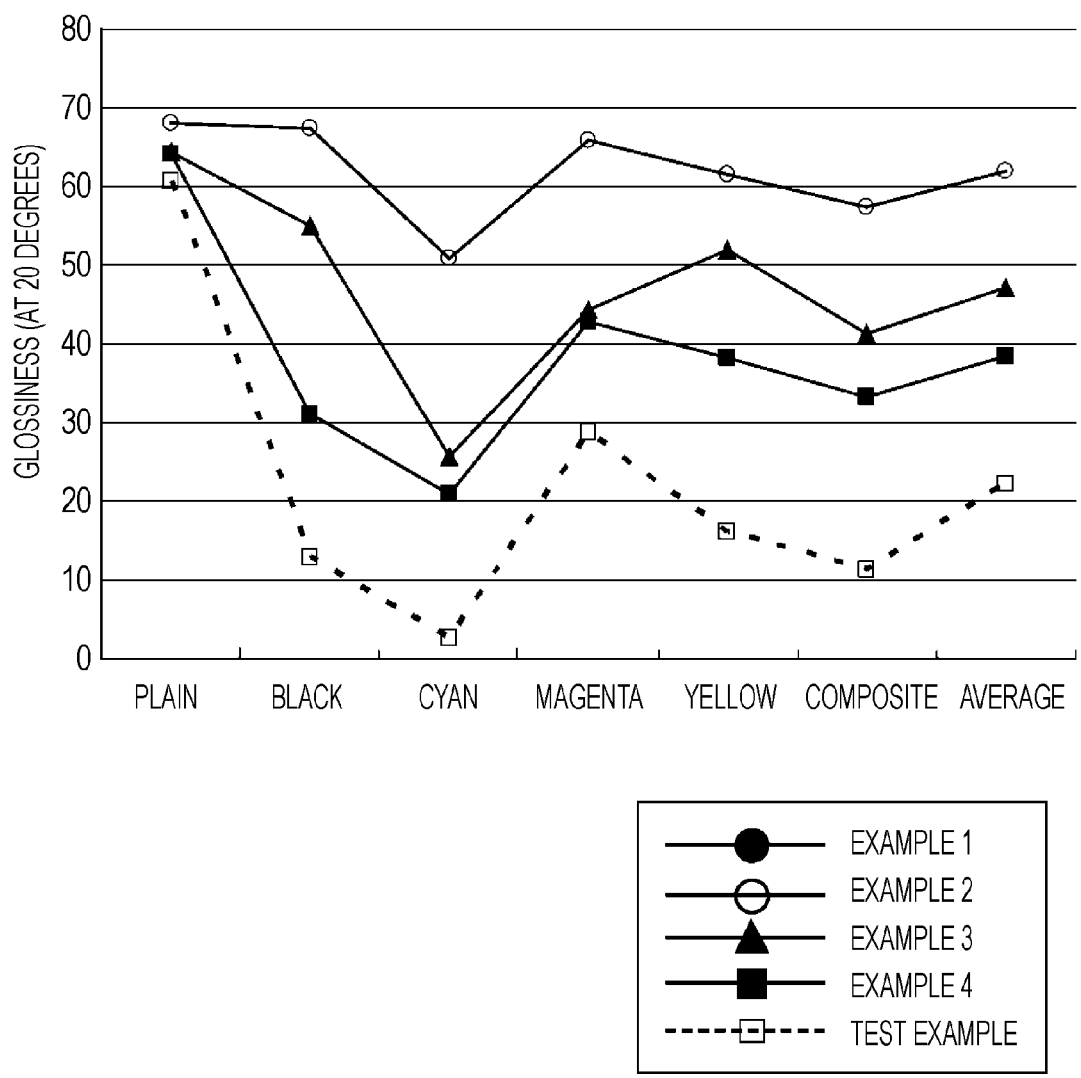

INK JET RECORDING METHOD AND RECORDING APPARATUS

Priority is claimed under 35 U.S.C. §119 to Japanese Application No. 2012-005375 filed on Jan. 13, 2012 and Japanese Application No. 2012-085202 filed on Apr. 4, 2012, both of which are hereby incorporated by reference in their entirety.

BACKGROUND

1. Technical Field

The present invention relates to an ink jet recording method and a recording apparatus.

2. Related Art

In the related art, various systems have been used as recording methods for forming an image on a medium to be recorded based on an image data signal. Among these, the ink jet method performs image formation directly on the medium to be recorded by ejecting ink to only necessary image portions using a low cost apparatus, and therefore can use ink efficiently and has low running costs. Furthermore, since the ink jet system makes little noise, it is an excellent recording method.

In recent years, a method is being focused on in which a colorless transparent clear ink is printed as a finishing coat after printing an image of colored ink, in order to increase the quality of the image.

For example, in JP-A-2010-221634, a method is disclosed in which an ink set provided with color inks and a clear ink containing a resin is prepared, and printing is performed on normal paper or high quality paper using the ink jet method. In addition, in the printing, first, a patch or image of color ink is printed onto the medium to be recorded, then subsequently, the clear ink is solid printed onto the printing region of the color ink, and finally, the medium to be recorded is dried by heating using a heater (see paragraph [0067] of the specification of JP-A-2010-221634).

However, in a case in which the finishing coat of the clear ink is applied at (approximately) the same time as the coating of the color ink (colored ink), as in the printing method disclosed in JP-A-2010-221634, an issue occurs in that the glossiness is poor. In addition, there are cases in which the ink disclosed in JP-A-2010-221634 adheres to the vicinity of the ink jet head, and a problem occurs in that the ink jet head clogging stability is poor.

SUMMARY

An advantage of some aspects of the invention is that it provides an ink jet recording method with excellent glossiness and ink jet head clogging stability.

The invention can be realized in the following forms or application examples.

Application Example 1

According to an application example, there is provided an ink jet recording method using at least a first ink composition containing a color material and a second ink composition containing a resin as well as substantially not containing a color material, the method including: a first recording step of forming an image by recording the first ink composition onto a medium to be recorded which is non-absorbent or poorly absorbent to ink using an ink jet head; a second recording step of recording the second ink composition onto the image using the ink jet head; a second drying step of drying the image at a first temperature, which is performed during execution of the second recording step or after the second recording step; and a third drying step of drying the image at a second temperature which exceeds the first temperature, and is performed after the second drying step, in which, the second ink composition does not substantially contain an aprotic polar solvent, and the heat deformation temperature of the resin exceeds the first temperature and is lower than the second temperature.

According to the ink jet recording method of the application example, even if recording using the second ink composition is performed on the image of the first ink composition in the second recording step by drying the image formed using the second ink composition at the first temperature, it is possible to obtain favorable ejection stability of the second ink composition, and a recorded object of a clear image. In addition, by performing a third drying step at a second temperature, which is higher than the first temperature, it is possible to fix an image formed using the second ink composition. Since the second ink composition does not substantially contain a color material and is a so-called clear ink composition, the rough surface appearance or irregular appearance of the image surface is almost entirely eliminated by the drying at the second temperature, and it is possible to obtain a highly glossy recorded object.

Application Example 2

In the ink jet recording method according to the above described application example, the resin is one or more types selected from an acrylic resin, a urethane resin, a polyester resin, and a styrene-acrylic resin.

According to the application example described above, it is possible to form a recorded object with excellent glossiness, and to obtain a recorded object with excellent durability by giving it higher color fastness to rubbing.

Application Example 3

In the ink jet recording method according to the above described application examples, the first recording step is executed during the performance of the transporting operation of the medium to be recorded in the forward direction, and the second recording step is executed during the performance of the transporting operation in the forward direction, which is executed during the performance of the transporting operation of the medium to be recorded in the reverse direction or after the transporting operation in the reverse direction has ended.

According to the application example described above, it is not necessary to provide the ink jet head in the ink jet recording method, which is a recording unit used in the recording step, and the heating apparatus such as the heater as a drying unit used in the drying step in each recording step, and it is possible to configure the recording apparatus using the minimum number of heads and heating apparatuses, therefore it is possible to obtain a miniature recording apparatus.

Application Example 4

In the ink jet recording method according to the above described application examples, the dryness factor of the image formed by the first recording step before the second recording step is 60% or higher.

According to the application example described above, even if recording using the second ink composition is performed on the image of the first ink composition in the second recording step by drying the image formed using the first ink composition at the first temperature to a dryness factor of 60% or higher, it is possible to suppress the occurrence of bleeding between an image derived from the first ink composition, and the second ink composition, and it is possible to obtain a recorded object with a clear image.

Application Example 5

In the ink jet recording method according to the above described application examples, the method includes a first drying step of drying the image at a first temperature performed during execution of the first recording step or before the second recording step, and the second recording step includes a step in which the second ink composition is recorded onto the image formed by the first recording step, and after the second ink composition on the medium to be recorded has dried, the second ink composition is re-recorded.

According to the application example described above, by forming two layers or more of the second ink composition which does not substantially contain a color material, that is the so-called clear ink composition, it is possible to obtain a recorded object in which the glossiness and the color fastness to rubbing are yet further improved.

Application Example 6

In the ink jet recording method according to the above described application examples, the ink jet head used in the first recording step is provided with nozzle rows formed from a plurality of nozzle holes, and scans in a main scanning direction through a scanning mechanism; the nozzle rows include a first nozzle row in which a plurality of the nozzle holes for ejecting the first ink composition are arranged in a sub-scanning direction intersecting the main scanning direction, and a second nozzle row in which a plurality of the nozzle holes for ejecting an undercoat ink composition which records an undercoat layer of the image are arranged in the sub-scanning direction; and the first recording step uses the first nozzle row and the second nozzle row divided in the sub-scanning direction into groups which respectively include a predetermined number of the nozzle holes, records the undercoat ink composition using a first group in an upstream side in the sub-scanning direction, and, records the first ink composition using a second group further to a downstream side in the sub-scanning direction than the first group.

According to the application example described above, it is possible to achieve high-speed recording by arranging the nozzle rows in a divided manner. In addition, by arranging the nozzle rows in a divided manner, it is possible to obtain a specific recorded object in which it is not necessary to perform so-called back-feed recording, in which recording is performed using a combination of the forward direction and reverse direction of the transport direction of the medium to be recorded, or the number of back-feeds may be reduced.

Application Example 7

According to another application example, there is provided a recording apparatus, in which an image is formed on the medium to be recorded using the ink jet recording method described above.

According to the recording apparatus of the application example, it is possible to easily obtain a recorded object with excellent glossiness and color fastness to rubbing while using a small recording apparatus.

BRIEF DESCRIPTION OF THE DRAWINGS

The invention will be described with reference to the accompanying drawings, wherein like numbers reference like elements.

FIG. 5 is a table showing a list of ink compositions used in the examples.

FIG. 6 is a table showing the results of a redispersibility evaluation of the resin emulsion contained in the second ink composition.

FIG. 7 is a table illustrating the recording method in the examples.

FIG. 8 is a table showing the examples.

FIG. 9 is a graph showing the glossiness in the examples.

DESCRIPTION OF EXEMPLARY EMBODIMENTS

Below, a detailed description will be given of aspects for embodying the invention. Furthermore, the invention is not limited to the following embodiments, and various modifications thereof may be made within the spirit of the invention. Furthermore, in the invention, in some cases, the first ink composition and the second ink composition are both referred to as the "ink composition". In the invention, the "first temperature" and the "second temperature" refer to the temperature of the surface of the medium to be recorded which makes contact with the ink composition. It is possible to measure these temperatures using a commercially available thermography apparatus. Specific examples of the thermography apparatus include the infrared thermography apparatus H2640/H2630 (trade names), (manufactured by NEC Avio Infrared Technologies Co., Ltd.).

First Embodiment

Ink Jet Recording Apparatus

The ink jet recording apparatus (hereinafter, also referred to as simply the "recording apparatus") according to the first embodiment of the invention is not particularly limited, as long as the apparatus ejects an ink composition from a head to perform recording while relatively moving an ink jet head for ejecting the first ink composition and an ink jet head for ejecting the second ink composition (hereinafter, also referred to as simply the "heads") in relation to the medium to be recorded. Furthermore, the head for ejecting the first ink composition and the head for ejecting the second ink composition may each be different heads, and may also be the same head as one another.

An off-carriage type serial printer (hereinafter, also known as simply the "printer") will be exemplified as the recording apparatus according to the present embodiment and illustrated with reference to the pictures. Here, a serial printer performs recording while the head reciprocates in a direction that intersects the transport direction of the medium to be recorded. Among these, an off-carriage type serial printer is a printer in which the ink cartridge in which the ink composition is stored and the head on the carriage are connected by a tube. Furthermore, in the figures used in the following description, the scale of each member is appropriately changed to make each member a visually recognizable size.

Figure 1:
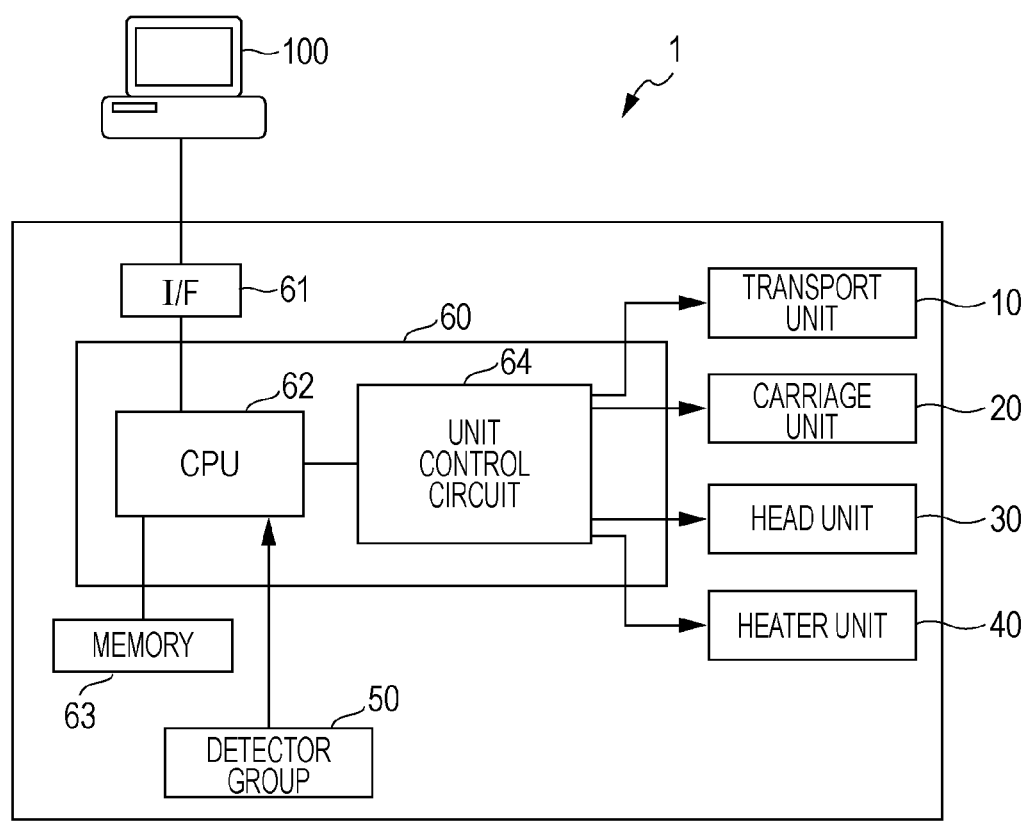
FIG. 1 is a block diagram showing the configuration of a printer according to a first embodiment.
Figure 2:
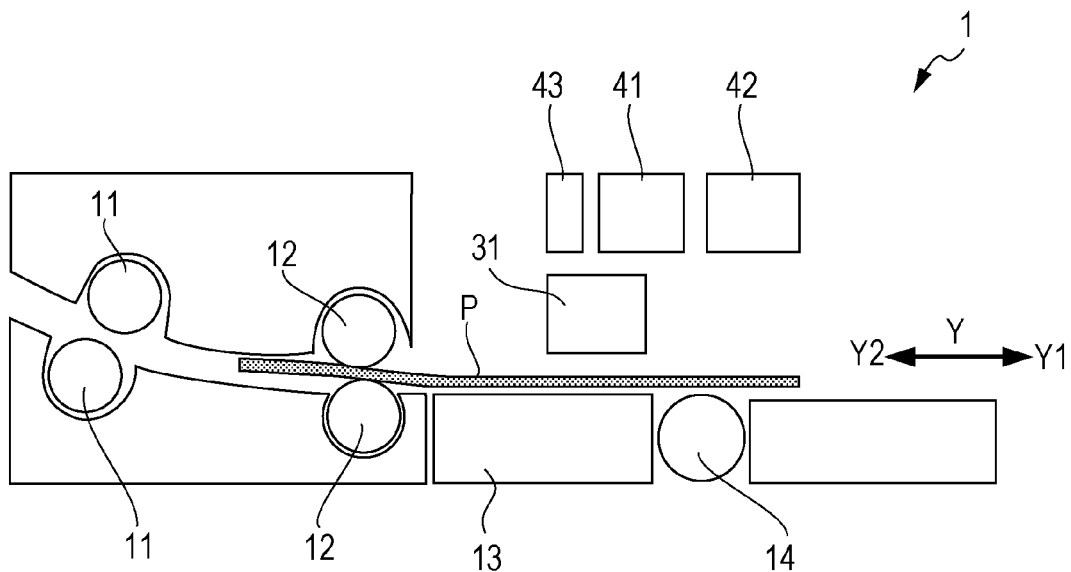
FIG. 2 is a schematic cross-sectional view of the vicinity of the head of the printer according to the first embodiment.

FIG. 1 is a block diagram showing the configuration of a printer 1. FIG. 2 is a schematic cross-sectional view of the vicinity of the head of the printer 1. Here, the horizontal direction (Y) of the paper face shown in FIG. 2 corresponds to the direction (path) in which the medium to be recorded is transported.

The printer 1 according to the present embodiment is an apparatus which forms an image on the medium to be recorded P by ejecting the first ink composition and the second ink composition in this order toward the medium to be recorded P which is non-absorbent or poorly absorbent to ink (hereinafter, referred to as simply the "medium to be recorded"). Here, the printer 1 can form an image using ink compositions of various colors, and examples of printing that uses the first ink composition include, for example, forming an image using ink compositions of the four colors of CMYK, or forming an undercoat which gives excellent opacity to the medium to be recorded P using a white ink composition. In addition, examples of printing that uses the second ink composition include, for example, applying a finishing coat of a clear ink composition on the first ink composition, thereby it is possible to increase the appearance of glossiness.

The printer 1 includes a transport unit 10, a carriage unit 20, a head unit 30, a heater unit 40, a detector group 50, and a controller 60. The printer 1 that received the printing data from the computer 100 which is an external apparatus controls each unit (the transport unit 10, the carriage unit 20, the head unit 30, and the heater unit 40) using the controller 60. The controller 60 forms an image on the medium to be recorded P by controlling each unit based on the printing data received from the computer 100. The situation within the printer 1 is monitored by the detector group 50, and the detector group 50 outputs the detection result to the controller 60. The controller 60 controls each unit based on the detection results output from the detector group 50.

The transport unit 10 is for transporting the medium to be recorded P, such as paper, in a specific direction (hereinafter, referred to as the "transportation direction" or the "sub-scanning direction"). This transport unit 10 includes a paper feed roller 11, a transport motor (not shown), a transport roller 12, a platen 13, and a paper output roller 14. The paper feed roller 11 is a roller for feeding the medium to be recorded P, which is inserted into the paper insertion opening, into the printer 1. The transport roller 12 is a roller which transports the medium to be recorded P, which is fed by the paper feed roller 11, to a printable region, and is driven by the transport motor. The platen 13 supports the medium to be recorded P during printing, and the medium to be recorded P is fed over the platen 13 using the drive of the paper feed motor (not shown). The paper output roller 14 is a roller which discharges the medium to be recorded P to an outer portion of the printer, and is provided to the downstream side in the transport direction in relation to the printable region.

The carriage unit 20 is a movement mechanism which moves, in other words, scans the head 31 in a direction (hereinafter, referred to as the "movement direction" or the "main scanning direction") which intersects the transport direction (the sub-scanning direction) while ejecting the ink composition in relation to the medium to be recorded P which is stopped on the printing region. The carriage unit 20 includes a carriage (not shown) and a carriage motor (not shown). The carriage is provided with a head 31 on the inner portion thereof, and communicates with the carriage motor (not shown) via a timing belt (not shown). The ink cartridge (not shown) is installed in a different location to the carriage, and is stored in the cartridge storage portion (not shown) provided on the outside of the printer 1 main body (the outside of the movement range of the carriage). An ink supply tube (not shown) connects between the ink cartridge and the carriage. In this case, the ink cartridge and the carriage do not move together. Furthermore, the carriage reciprocates along a guide shaft of the carriage motor in a state of being supported by the guide shaft that intersects the transport direction described below. The carriage is supported by the guide shaft to be reciprocally movable in the axial direction of the guide shaft.

The head unit 30 is for ejecting the first ink composition and the second ink composition in relation to the medium to be recorded P. The head unit 30 is provided with a head 31 which includes a plurality of nozzle holes. Since the head 31 is provided on the inner portion of the carriage, when the carriage moves in the movement direction, the head 31 also moves in the movement direction. In addition, the head unit 30 ejects the first ink composition and the second ink composition in relation to the medium to be recorded P while the head 31 moves in the movement direction. Accordingly, a row of dots is formed on the medium to be recorded P along the movement direction.

In this manner, the head 31 ejects the first ink composition and the second ink composition in relation to the medium to be recorded P, and thereby it is possible to simplify the printer 1 as a recording apparatus.

The heater unit 40 is provided with a heating unit for drying and fixing an image formed by the ink composition ejected onto the medium to be recorded P. The heating unit is provided with a drying heater 41 which heats to a first temperature at which the ink composition ejected and attached to (landed on) the medium to be recorded P is dried to a specific dryness factor, and a curing heater 42 which further heats and cures the image, which was dried at the first temperature, at a temperature higher than the first temperature and fixes the image to the medium to be recorded P. In addition, an air blower 43 may also be provided in the heater unit 40 in order to promote drying of the image by the drying heater 41.

The drying heater 41 is arranged to the downstream side in the transport direction (the Y2 direction shown in FIG. 2) in relation to the head 31, and dries the image formed by the ink composition ejected from the head 31. The drying heater 41 is arranged adjacent to the air blower 43. The curing heater 42 further dries and cures the image which was dried using the drying heater 41, and is arranged to the downstream side in the transport direction in relation to the drying heater 41.

The detector group 50 includes a linear encoder, a rotary encoder, a paper detection sensor, an optical sensor, and the like. The linear encoder detects the position of the carriage in the movement direction. The rotary encoder detects the rotation amount of the transport roller 12. The paper detection sensor detects the position of the distal end of the paper (medium to be recorded P) during feeding. The optical sensor detects the presence of the medium to be recorded P by fitting a light emitting portion and a light receiving portion to the carriage. The optical sensor detects the position of an end portion of the medium to be recorded P while moving in accordance with the carriage, and can detect the width of the medium to be recorded P. In addition, the optical sensor can also detect the distal end (also referred to as the end portion to the downstream side in the transport direction, or the upper end) or the rear end (also referred to as the end portion to the upstream side in the transport direction, or the lower end) of the medium to be recorded P according to the situation.

The controller 60 is a control unit for performing control of the printer 1. The controller 60 includes a CPU 62 and a unit control circuit 64. The interface unit 61 performs transceiving of data between the computer 100, which is an external apparatus, and the CPU 62. The CPU 62 is a processing unit for performing overall control of the printer 1. Memory 63 is for securing a region which stores programs of the CPU 62, an operation region, or the like, and includes a memory element such as RAM or EEPROM. The CPU 62 controls each unit via the unit control circuit 64 in accordance with the program stored in the memory 63.

When performing printing, the controller 60, as described below, alternately repeats a dot formation operation which ejects the ink composition from the head 31 during movement in the movement direction, and a transport operation which transports the medium to be recorded P in the transport direction, and prints the image (including the finishing coat image) configured from a plurality of dots to the medium to be recorded P. In this manner, the ink jet recording apparatus using the above-described ink composition forms an image (including the finishing coat image) on a region of the printed medium P opposing the head 31.

Modification Examples of Ink Jet Recording Apparatus

The recording apparatus described above is an off-carriage type serial printer. While not shown, in a case in which a large capacity ink tank is additionally provided on the outside of the printer 1, an ink supply tube connects between the large capacity ink tank and the ink cartridge. Accordingly, in the same manner as in an on-carriage type printer, it is also possible to greatly increase the storage amount of the ink composition in the off-carriage type printer 1.

In addition, the recording apparatus of the present embodiment may also be the on-carriage type serial printer, in which an ink cartridge (ink tank) is installed together with the head 31 on the carriage. In the case of the on-carriage type, the carriage holds an ink cartridge, which accommodates the ink composition, in a removable manner. In addition, the recording apparatus of the present embodiment may also be a line printer in which recording is performed without the head moving substantially.

Second Embodiment

Ink Jet Recording Method

The ink jet recording method (hereinafter, also referred to as simply the "recording method") according to the second embodiment may perform recording using the ink jet recording apparatus 1 according to the first embodiment. The ink jet recording method according to the present embodiment includes at least the first recording step and the second recording step described below. In addition, it is preferable that the ink jet recording method according to the present embodiment include a first drying step to be performed during the execution of the second recording step or after the second recording step, and a second drying step to be executed after the first drying step at a second temperature which is a temperature that exceeds the first temperature of the first drying step.

Below, description will be given of a recording method which performs transport in the reverse direction to the transport path of the medium to be recorded P, the recording method which incorporates the so-called back-feed, with reference to FIG. 2, and each step in relation to the ink jet recording method according to the second embodiment will be described in detail. FIG. 2 is a schematic cross-sectional view of the ink jet recording apparatus 1 which executes the ink jet recording method that incorporates the back-feed.

First Recording Step

In the first recording step, an image is formed by recording the first ink composition onto the medium to be recorded P which is non-absorbent or poorly absorbent to ink using the head 31. In other words, an image formed from the first ink composition is formed by ejecting the first ink composition from the head 31 toward the medium to be recorded P so as to attach it thereto (land it thereon). In the first recording step, it is possible to form the image by using ink compositions of various colors. For example, it is possible to form an image using ink compositions of the four colors of CMYK, or to form an undercoat which gives excellent opacity to the medium to be recorded using a white ink composition. Furthermore, the first recording step is considered to be complete at the point in time that the first ink composition ejected from the head 31 has formed a film (become a film).

In particular, in the case of a recording method that has incorporated the back-feed, as shown in FIG. 2, the first printing step is executed at the same time as the transport operation in the forward direction of the sub-scanning direction (the Y direction in the drawings) of the medium to be recorded P, in other words, the direction (Y1 direction) from the upstream side to the downstream side in the transport direction. In addition, in the first recording step, the image is formed by ejecting the first ink composition from the nozzle holes within the head 31 toward the medium to be recorded P, and landing the first ink composition thereon, in the main scanning direction of a direction substantially orthogonal to the sub-scanning direction. In this case, in the recording method using a serial printer, multi-pass printing, in which a number of passes (number of main scans) is two or more, is possible. By forming the image by coating multiple layers of the ink composition divided into two or more passes using the multi-pass printing, it is possible to obtain an image of superior quality.

First Drying Step

The ink jet recording method of the present embodiment further includes a first drying step. The first drying step may be performed using a plurality of drying units (heaters). In the first drying step, the step is performed during the execution of the first recording step or after the first recording step, but before the second recording step which is described below, and the image is dried at a specific temperature (this may be a plurality of temperatures, and may also be the same as the first temperature or the second temperature described below). Furthermore, it is preferable that the dryness factor of the image formed by the first recording step before the second recording step be 60% or higher (it is preferable to further use a curing heater 42 together with the heater). The layer formed from the second ink composition has a high glossiness due to the dryness factor of the image before the second recording step being 60% or higher. In addition, it is possible to prevent the occurrence of bleeding between the image derived from the first ink composition, and the second ink composition. The dryness factor is, due to being able to increase the glossiness of the image and in order to prevent the occurrence of bleeding yet more effectively, preferably 70% or higher, and more preferably 80% or higher.

Figure 4:
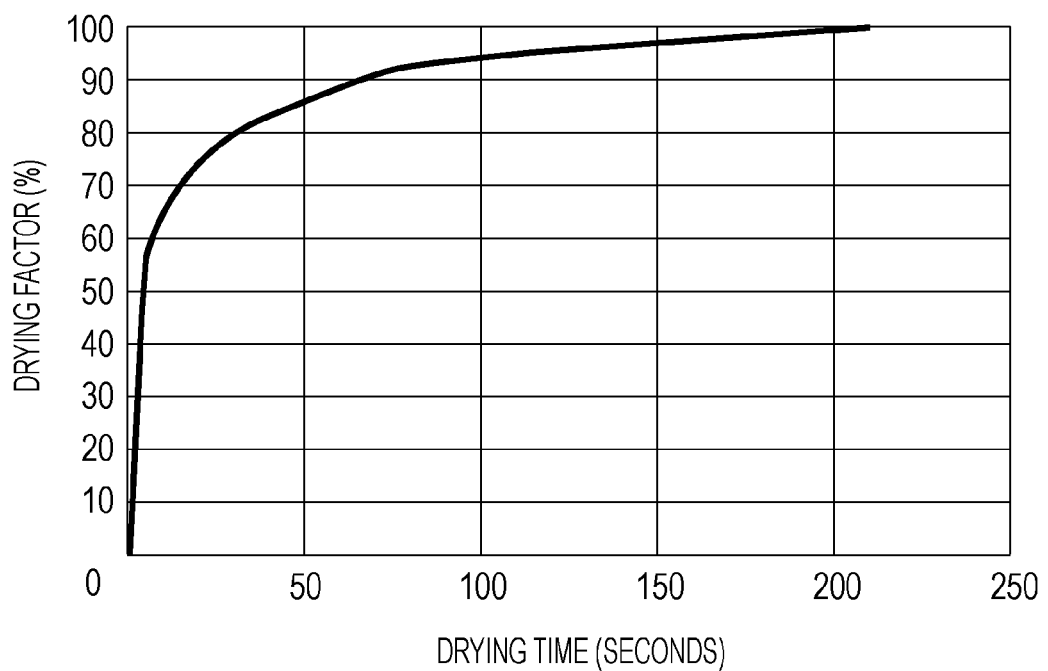
FIG. 4 is a graph for calculating the dryness factor in the first drying step.

Furthermore, the "dryness factor" in the present specification is calculated by dividing the difference between the mass of the ink composition during ejection and the mass of the ink composition after drying, by the difference between the mass of the ink composition during ejection and the mass of the ink composition after drying at a point in time that the mass change due to drying has substantially stopped. For example, the dryness factor in the first drying step is measured and calculated in the manner described below. The mass of the medium to be recorded P when the first ink composition is applied to the medium to be recorded and the image is formed is equivalent to a dryness factor of 0%. Furthermore, the point in time at which the image has been dried under specific drying conditions and the mass change of the medium to be recorded P has substantially stopped is equivalent to a dryness factor of 100%. Using these two items of data and the mass data of the first ink composition at a point in time that the second ink composition is recorded, it is possible to calculate the dryness factor. Furthermore, description will be given with reference to the graph of FIG. 4 which shows the change over time of the dryness factor in a case where the drying time has been changed in the first drying step.

In this manner, in the ink jet recording method according to the present embodiment, the first recording step and the second recording step will not be (substantially) performed at the same time by performing the second recording process described below after setting the dryness factor of the image obtained by the first recording step to 60% or higher by using the first drying step. Therefore, the problem of the ink composition bleeding is not present, and the application amount of the ink composition is not particularly limited.

The drying for setting the dryness factor of the image to 60% or higher (hereinafter, also referred to as the "drying of a dryness factor of 60% or higher") is performed using at least the drying heater 41 (preferably used together with the curing heater 42). As shown in FIG. 2, since the drying heater 41 adjoins the head 31 which ejects the first ink composition, the ejection and drying of the first ink composition are performed at (substantially) the same time. In other words, the medium to be recorded P (substantially) does not move in the sub-scanning direction while the first recording step and the first drying step are being performed. As the drying heater 41, there are no particular limitations, however for example, an infrared heater, a warm air heater, and a hot air heater may be exemplified. Among these, the infrared heater, in which heating is extremely fast (the rate of temperature increase), is preferable because it is possible to heat only the medium to be recorded P. Furthermore, since the dryness factor of the image is set to 60% or higher in a preferable first drying step, it is possible to perform drying at the first temperature and subsequently perform further drying at the second temperature which is a temperature higher than the first temperature. In this case, it is possible to perform the further drying using the curing heater 42 which heats at the second temperature.

Back-Feed Step

In the back-feed step, the transportation of the medium to be recorded P is performed in the reverse direction of the sub-scanning direction of the medium to be recorded P, in other words, the direction (the Y2 direction shown in FIG. 2) from the downstream side to the upstream side of the transport direction. More specifically, the medium to be recorded P obtained through the first recording step and the first drying step is transported in the Y1 direction shown in FIG. 2, or preferably, is transported in the Y1 direction until the medium to be recorded P is in front of the curing heater 42, after which the medium to be recorded P is transported in the Y2 direction. Furthermore, in order to form a desired image, after completing the back-feed step without ejecting the ink composition from the head 31 toward the medium to be recorded P during the back-feed step, it is preferable to eject the ink composition when transporting toward the downstream side in the transport direction.

Second Recording Step

In the second recording step, recording is performed by ejecting the second ink composition onto the medium to be recorded P in relation to an image dried in the first drying step using the head 31. In other words, the second ink composition forms a finishing image coated on the image formed using the colored ink composition by ejecting the second ink composition from the head 31 toward an image formed using a colored ink composition in the first recording step so as to attach (land) the second ink composition thereto. In this manner, the image in the present embodiment is completed by being formed in stages. Furthermore, the second recording step is considered to be complete at the point in time that the second ink composition ejected from the head 31 has formed a film (become a film).

In particular, in a case of the recording method including a back-feed step, the second recording step is performed during the execution of the transporting operation to the Y2 direction shown in FIG. 2, or after the transporting operation to the Y2 direction. In addition, in the second recording step, the finishing coat image is formed by ejecting the second ink composition from the nozzle holes within the head 31 toward the image obtained in the first recording step, and landing the second ink composition thereon. Furthermore, the second recording step may also perform the recording using the second ink composition while transporting in the Y1 direction after completing the transporting operation to the Y2 direction. In addition, as shown in FIG. 2, the head 31 in the second recording step is the same as the head 31 in the first recording step, and therefore it is possible to further miniaturize the recording apparatus. Furthermore, the head 31 in the first recording step and the head 31 in the second recording step may also be different heads.

It is possible to form a recorded object (image) with excellent glossiness and color fastness to rubbing by applying a finishing coat of the second ink composition using the second recording step. Furthermore, in a case of making the glossiness and the color fastness to rubbing of the recorded object (image) superior, it is preferable to perform the recording operation in the second recording step two or more times. In other words, it is preferable that the second recording step record (finish coat) the second ink composition to the image obtained in the first recording step, and re-record (finish coat) the second ink composition after the layer of the second ink (hereinafter, referred to as the "clear ink layer") on the medium to be recorded P has dried. In this case, this may be referred to as the second coating of the second ink composition. Furthermore, in a case where the finish coating described above is performed, the compositions (the type and content of the formulation ingredients) of the second ink compositions which configure each clear ink layer may be the same as, or different from each other.

Second Drying Step

The ink jet recording method of the present embodiment further includes a second drying step. In the second drying step, the step is performed during the execution of the second recording step or after the second recording step, and the image formed using the second recording step is dried using the first temperature. It is preferable that the first temperature be 40° C. or higher and lower than 70° C. from a viewpoint of ejection stability of the second ink composition, as described in the first drying step described above. Furthermore, in the second drying step, in a case that the dryness factor of the image is set to 60% or higher, it is possible to perform drying at the first temperature and subsequently perform further drying at the second temperature which is a temperature higher than the first temperature. In this case, it is possible to perform the further drying using the curing heater 42 which heats at the second temperature. In addition, since the drying is promoted when drying the image using at least the drying heater 41 in the second drying step, an air blower 43 may also be used.

The first temperature in the second drying step is, as described below, at least below the heat deformation temperature of the resin contained in the second ink composition. When the first temperature is below the heat deformation temperature of the resin, it is possible to prevent the head 31 from being damaged by the heat. The specific temperature of the first temperature is preferably from 40° C. to 60° C. in order to satisfy all of the conditions described above. In addition, in order to promote drying in the second drying step, an air blower 43 may also be used. The air blower 43 may also supply either air of an ambient temperature or cold air. In addition, it is preferable to arrange the air blower 43 in the vicinity of the drying heater 41, in other words, in the vicinity of the head 31.

Furthermore, in a case of the recording method including a back-feed step, it is preferable for the second drying step to execute the second drying step after each recording step in a case where the recording operation in the second recording step is performed two or more times. Accordingly, it is possible to make the glossiness and the color fastness to rubbing of the recorded object (image) superior.

Third Drying Step

It is preferable that the ink jet recording method of the present embodiment further include a third drying step. The third drying step is executed after the second drying step. The third drying step is a drying step using the second temperature, and is preferably performed using the curing heater 42 which is set to the second temperature. As described above, the second temperature is set higher than the first temperature, and is set to a temperature which cures and fixes the image using the second ink composition formed in the second recording step by further increasing the dryness factor thereof.

The second temperature, at which the dryness factor of the third drying step becomes 70% or higher, is set, and as described below, is preferably set to at least above the film forming temperature (MFT: Minimum Film Forming Temperature), or above the glass transition point Tg of the resin contained in the second ink composition. Since the resin described above melts and the rough surface appearance or irregular appearance of the finishing coat image are almost entirely eliminated due to setting the second temperature to MFT or Tg or higher, the glossiness is superior. The specific temperature of the second temperature is preferably from 70° C. to 120° C., and more preferably from 80° C. to 110° C. in order to satisfy all of the conditions described above. Furthermore, the MFT will be described below.

Due to the ink jet recording apparatus 1 which executes the above steps including a back-feed step and performing transportation periodically in the reverse direction (the Y2 direction) to the transport direction (the Y1 direction shown in FIG. 2) of the medium to be recorded P, it is possible to minimize the number of heaters provided in the head 31 and the heater unit 40, and therefore it is possible to realize miniaturization of the recording apparatus.

Modification Examples of Ink Jet Recording Method

1. Recording that does not Perform Back-Feed

As a modification example of the recording method of the present embodiment, leaving the medium to be recorded P stationary without transporting it and performing drying using the drying heater 41 or natural drying is exemplified instead of performing the back-feed recording which performs transportation in the reverse direction to the transport path of the medium to be recorded P.

2. Recording Using Division of Nozzle Rows

Figure 3:
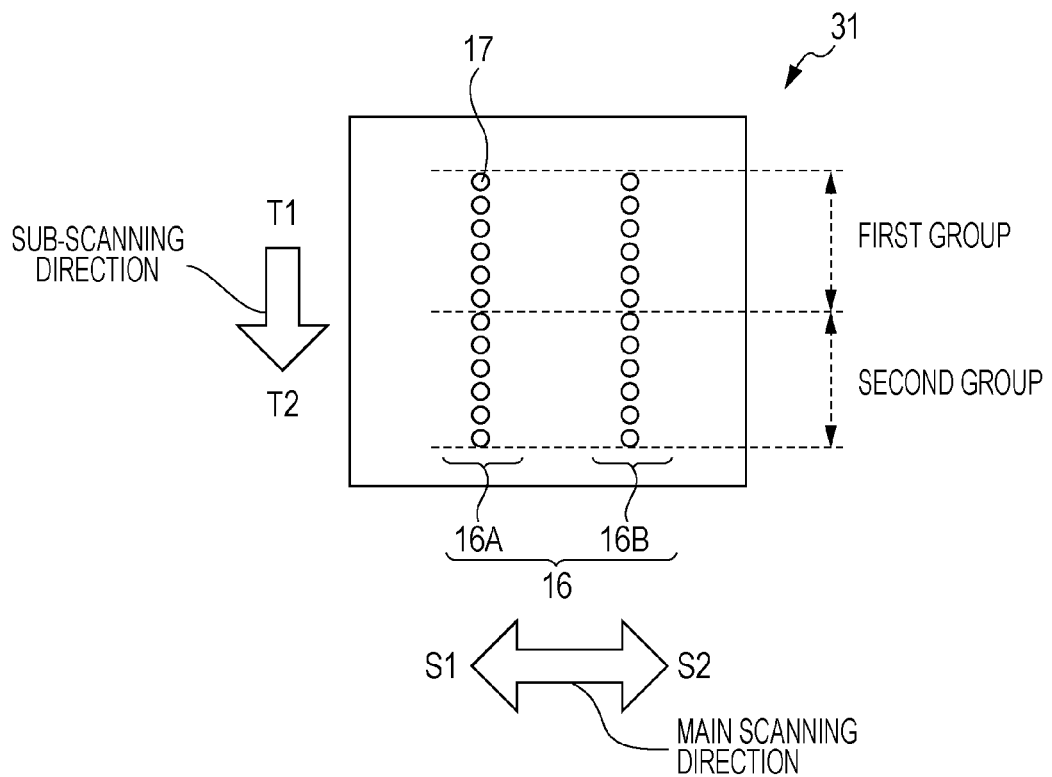
FIG. 3 is a schematic view illustrating the recording unit using divided nozzle rows of the printer according to the first embodiment.

As another modification example of the recording method of the present embodiment, performing a divided recording which performs recording by dividing the nozzle rows into groups of a specific number of nozzle holes may be exemplified. The ink jet head 31 used in the first recording step scans in the main scanning direction through a scanning mechanism, and is provided with a nozzle row formed from a plurality of nozzle holes. Furthermore, the nozzle rows include a first nozzle row in which a plurality of the nozzle holes for ejecting the first ink composition are arranged in a sub-scanning direction intersecting the main scanning direction, and a second nozzle row in which a plurality of the nozzle holes for ejecting an undercoat ink composition which records an undercoat layer of the image are arranged in the sub-scanning direction. At this time, the method in which the first recording step uses the first nozzle row and the second nozzle row divided in the sub-scanning direction into groups which respectively include a predetermined number of the nozzle holes, records the undercoat ink composition using a first group in the upstream side in the sub-scanning direction, and, records the first ink composition using a second group further to a downstream side in the sub-scanning direction than the first group, is referred to as the recording method using division. Below, the recording method will be described with reference to FIG. 3. FIG. 3 is a schematic view representing the recording unit using divided nozzle rows.

As shown in FIG. 3, the nozzle row 16 of a nozzle row 16A and a nozzle row 16B in which a plurality of nozzle holes 17 are formed in the sub-scanning direction is used divided into a first group on the upstream side T1 in the sub-scanning direction, and a second group further to the downstream side T2 in the sub-scanning direction than the first group. First, droplets of the undercoat ink composition are ejected from the first group of the first nozzle row 16A while moving the carriage 4 in the main scanning direction (S1 and S2), and the droplets of the undercoat ink composition are attached onto the medium to be recorded P.

Next, the medium to be recorded P is moved to the downstream site T2 direction in the sub-scanning direction by the amount of the length of the first group in the sub-scanning direction. Furthermore, the image is obtained by ejecting droplets of the first ink composition described above from the second group of the second nozzle row 16B while moving the carriage 4 in the main scanning direction, and attaching the droplets of the first ink composition onto the lower layer formed on the medium to be recorded P. In addition, it is also possible to perform in the same manner in a case in which the nozzle row 16 is used divided into three or more. Furthermore, the undercoat ink composition is not particularly limited, however, examples thereof include a white ink composition containing titanium dioxide and the like, and a glitter ink composition containing silver, aluminum and the like.

The recording method using the above-described division of the nozzle rows 16A and 16B is capable of achieving an increase in speed of the recording by dividing the nozzle rows 16A and 16B and using them. In addition, when the nozzle rows 16A and 16B are used divided, it is possible to avoid back-feeding of the medium to be recorded P, or the number of back-feeds of the medium to be recorded P may be reduced. Accordingly, it is possible to reduce the misalignment which can occur due to the back-feeding of the medium to be recorded P. In addition, in a preferable embodiment in a case where the undercoat ink composition is used, the image is formed by applying the undercoat ink composition and the first ink composition using divided nozzle rows, the recording medium is transported to the downstream side in the transport direction and the image is dried using a heating mechanism on the downstream side. Furthermore, an embodiment is preferable in which back-feeding is performed thereafter and the second ink composition is applied.

3. Recording Using Line Printer

Above, description has been given of the recording method and the modification examples in relation to the recording using a serial printer. Meanwhile, in the case of recording using a line printer, due to the structure of the printer, the same number of line heads is necessary as the number of types of the ink composition. Therefore, for example, as described above, in a case where the second ink composition is recorded twice (two coatings are made) in relation to the image obtained using the first recording step, two line heads for ejecting the second ink composition are necessary.

Ink Composition

The ink composition (including the first ink composition and the second ink composition, the same hereinafter) described above is used in the ink jet recording method according to the embodiment described above. The first ink composition contains a color material. The second ink composition contains a resin and does not substantially contain a color material. Here, "does not substantially contain" in the present specification refers to not containing an amount or greater in which the meaning of being added is sufficiently exhibited. Quantitatively, "does not substantially contain" means that the content in relation to the total mass (100 mass %) of the ink composition is 0.5 mass % or less, preferably 0.2 mass % or less, more preferably 0.1 mass % or less, even more preferably 0.05 mass % or less, and even more preferably 0.01 mass % or less. Below, description will be given in relation to an additive (component) which may or may not be contained in, or there is a possibility that it will be contained in the ink composition.

Color Material

The first ink composition contains a color material. It is possible to use at least one of a pigment and a dye for the color material.

Pigment

By using a pigment as the color material, it is possible to improve the glossiness of the ink composition. It is possible to use either of an inorganic pigment and an organic pigment as the pigment. As the inorganic pigment, it is possible to use carbon blacks (C. I. Pigment Black 7) such as furnace black, lamp black, acetylene black, or channel black, iron oxide, and titanium oxide.

Examples of the organic pigment include azo pigments such as insoluble azo pigments, condensed azo pigments, azo lake, and chelate azo pigments; polycyclic pigments such as phthalocyanine pigments, perylene and perinone pigments, anthraquinone pigments, quinacridone pigments, dioxazine pigments, thioindigo pigments, isoindolinone pigments, and quinophthalone pigments; dye chelates (for example, basic dye type chelates, acid dye type chelates, and the like), dye lakes (basic dye type lakes, and acid dye type lakes), nitro pigments, nitroso pigments, aniline black, and daylight fluorescent pigments.

More specifically, examples of the carbon black used in a black ink include No. 2300, No. 900, MCF88, No. 33, No. 40, No. 45, No. 52, MA7, MA8, MA100, No. 2200B, and the like (manufactured by Mitsubishi Chemical Corporation), Raven 5750, Raven 5250, Raven 5000, Raven 3500, Raven 1255, Raven 700 and the like (manufactured by Carbon Columbia), Regal 400R, Regal 330R, Regal 660R, Mogul L, Monarch 700, Monarch 800, Monarch 880, Monarch 900, Monarch 1000, Monarch 1100, Monarch 1300, Monarch 1400 and the like (manufactured by CABOT JAPAN K.K.), Color Black FW1, Color Black FW2, Color Black FW2V, Color Black FW18, Color Black FW200, Color Black 5150, Color Black 5160, Color Black 5170, Printex 35, Printex U, Printex V, Printex 140U, Special Black 6, Special Black 5, Special Black 4A, and Special Black 4 (manufactured by Degussa).

Examples of the pigment used in a white ink include C. I. Pigment White 6, 18, and 21.

Examples of the pigment used in a yellow ink include C. I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of the pigment used in a magenta ink include C. I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245, or C. I. Pigment Violet 19, 23, 32, 33, 36, 38, 43, and 50.

Examples of the pigment used in a cyan ink include C. I. Pigment Blue 1, 2, 3, 15, 15:1, 15:2, 15:3, 15:34, 15:4, 16, 18, 22, 25, 60, 65, or 66, and C. I. Vat Blue 4, or 60.

In addition, examples of pigments other than magenta, cyan and yellow include, for example, C. I. Pigment Green 7, or 10, C. I. Pigment Brown 3, 5, 25, or 26, and C. I. Pigment Orange 1, 2, 5, 7, 13, 14, 15, 16, 24, 34, 36, 38, 40, 43, or 63.

Furthermore, one type of the above pigments may be used alone or two or more types thereof may be used together.

When the pigments are used together, the average particle diameter thereof is preferably 300 nm or smaller, and is more preferably from 50 to 200 nm. When the average particle diameter is within the above range, it is possible to form an image with superior reliability such as the ejection stability and the dispersion stability in relation to the ink composition, as well as being of excellent quality. Here, the average particle diameter in the present specification is measured using a dynamic light scattering method.

Dye

It is possible to use a dye as the color material. The dye is not particularly limited, and it is possible to use an acidic dye, a direct dye, a reactive dye, and a basic dye as the dye. Examples of the dye include, for example, C. I. Acid Yellow 17, 23, 42, 44, 79, or 142, C. I. Acid Red 52, 80, 82, 249, 254, or 289, C. I. Acid Blue 9, 45, or 249, C. I. Acid Black 1, 2, 24, or 94, C. I. Food Black 1, or 2, C. I. Direct Yellow 1, 12, 24, 33, 50, 55, 58, 86, 132, 142, 144, or 173, C. I. Direct Red 1, 4, 9, 80, 81, 225, or 227, C. I. Direct Blue 1, 2, 15, 71, 86, 87, 98, 165, 199, or 202, C. I. Direct Black 19, 38, 51, 71, 154, 168, 171, or 195, C. I. Reactive Red 14, 32, 55, 79, or 249, and C. I. Reactive Black 3, 4, or 35.

Furthermore, one type of the above dyes may be used alone or two or more types thereof may be used together.

Since it is possible to obtain excellent concealment and color reproduction, the content of the color material is preferably from 1 to 20 mass % in relation to the total mass (100 mass %) of the ink composition.

Dispersant

In a case where the ink composition contains a pigment, in order to further improve the pigment dispersibility, the pigment may further contain a dispersant. As the dispersant, there are no particular limitations, however for example, a dispersant typically used to prepare a pigment dispersion such as a polymeric dispersant may be exemplified. Specific examples include dispersants with one or more types of polyoxyalkylene polyalkylene polyamines, vinyl-based polymers and copolymers, acrylic-based polymers and copolymers, polyesters, polyamides, polyimides, polyurethanes, amino-based polymers, silicon-containing polymers, sulfur-containing polymers, fluorine-containing polymer, and epoxy resins as the main component. Examples of commercial polymer dispersants include the AJISPER series manufactured by Ajinomoto Fine-Techno Co., Inc., the Solsperse series (Solsperse 36000 and the like) which may be obtained from Avecia Inc. or Noveon, the Dispervic series manufactured by BYK Chemie, and the Disparon series manufactured by Kusumoto Chemicals, Ltd.

Resin

The second ink composition according to the present embodiment contains a resin (resin particles). Due to the second ink composition containing a resin, the color fastness to rubbing of mainly the finishing coat image may be made excellent.

Furthermore, the first ink composition according to the present embodiment may contain a resin. However, in a case where the first ink composition does not contain a resin, since the concentration of the color material of the first ink composition may be increased relatively, it is possible not to damage the quality of the image.

In particular, when performing the drying step described above, the heat deformation temperature of the resin is preferably the first temperature or higher, and the second temperature or lower. When the heat deformation temperature is the first temperature or higher, the clogging stability of the head 31 is superior. Meanwhile, when the heat deformation temperature is the second temperature or lower, since the resin melts and the surface of the finishing coat image becomes smoother, the glossiness of the image is superior.

Here, the "heat deformation temperature" in the present specification is the temperature value represented by the glass transition temperature (Tg) or the Minimum Film Forming Temperature (MFT). Among these, since it is easier to ascertain the superiority or inferiority of the redispersibility of the resin with the MFT than with the Tg, it is preferable that the heat deformation temperature be the temperature value represented by the MFT. When the ink composition has excellent redispersibility of the resin, the clogging stability of the head 31 is superior due to the ink composition not adhering. Furthermore, the method given in the section of the embodiments will be adopted for the evaluation method of the redispersibility in the present specification. In addition, the Tg in the present specification is disclosed as the value measured by using the differential scanning calorimetry method. The MFT in the present specification is disclosed as the value measured by using ISO 2115:1996 (title:Plastics—Polymer dispersions—Determination of white point temperature and minimum film-forming temperature).

It is preferable that the volume based average particle diameter of the resin particles be from 50 to 200 nm. In a case where the average particle diameter is within the above range, it is possible to obtain superior glossiness, and clogging stability of the head 31, and to form the finishing coat image of a desired quality over a long period.

The resin is not particularly limited to the following examples, however, examples include polyester resins such as aliphatic polyester resins and aromatic polyester resins, vinyl resins such as polyvinyl chloride resins, polyvinyl acetate resins, and polyvinyl alcohol resins, vinyl chloride-vinyl acetates, ethylene-acetate vinyl resins, polyvinyl butyral resins, and cellulose resins such as ethyl cellulose resins, cellulose acetate propionate resins, and nitrocellulose resins, (meth)acrylic resins such as poly(meth)acrylic resins, poly(meth)acrylate methyl resins, and poly(meth)acrylate ethyl resins, ethylene-(meth)acrylic resins, styrene-(meth)acrylic resins, ethylene-(meth)acrylate resins, urethane resins, polystyrene resins, polycarbonate resins, phenoxy resins, polyamide resins, polyimide resins, polysulfane-based resins, petroleum resins, chlorinated polypropylene resins, polyolefin resins, ethylene-alkyl(meth)acrylate resins, rosin-modified phenolic resins, and various types of synthetic rubber such as NBR, SBR, and MBR, as well as modifications of the above. When the resin is one of these components, it is possible to obtain a finishing coat image of excellent glossiness and color fastness to rubbing. In addition, it is possible to obtain superior glossiness, and clogging stability, and to form the finishing coat image of an excellent quality over a long period.

Among these, the resin is preferably one or more types selected from an acrylic resin, a urethane resin, a polyester resin, and a styrene-acrylic resin, since they have excellent durability.

In addition, among the resins, those which can form an emulsion are preferable. When a resin which can form an emulsion as a resin is selected, it is possible to fix the second ink composition yet more effectively on the image formed using the first ink composition due to a film being formed by drying.

Among these, a water-based urethane resin emulsion is preferable. Examples of commercial products include Mowinyl 972 (solids concentration 50%), 6530 (solids concentration 44%), and 742A (solids concentration 46%) (trade names) manufactured by Nippon Synthetic Chemical Industry Co., Ltd., VINYBLAN 2500E (solids concentration 35%) (trade name) manufactured by Nissin Chemical Industry CO., Ltd., Superflex 110, 130, 170, 210, 300, 420, 420NS, 460, 470, 500, 610, 620, 650, 700, 740, 860, 870, E-2000, E-2500, E-4000, E-4800, and R-5000 (trade names) manufactured by Dai-ichi Kogyo Seiyaku Co., Ltd., NeoRez R-9660, R-972, R-9637, R-967, and R-940 (trade names) manufactured by Kusumoto Chemicals, and Adeka Bontighter HUX-380, 401, 290K, 394, and 680 (trade names) manufactured by Adeka.

The resin may be either anionic, nonionic, or cationic. Among these, nonionic or anionic is particularly preferable from a viewpoint of having suitable material properties for the head 31. In addition, one type of the resin may be used in isolation, and two types or more may also be used together.

The content of the resin in relation to the total mass (100 mass %) of the second ink composition is preferably from 1 to 30 mass %, and more preferably from 5 to 10 mass %. In a case where the resin is within the above ranges, it is possible to obtain a formed finishing coat image of superior glossiness and color fastness to rubbing.

Surfactant

The ink composition according to the present embodiment may contain a surfactant. As the surfactant, it is preferable to use an acetylene glycol-based surfactant or a polysiloxane-based surfactant. The acetylene glycol-based surfactant or the polysiloxane-based surfactant improve the affinity (wettability) of the recorded surface in the medium to be recorded P, such that it is possible to improve the permeability of the ink composition.

A commercial product may be used as the acetylenic glycol surfactant, examples of which include Olefin E1010, STG, or Y (trade names) manufactured by Nissin Chemical Industry Co., Ltd., Surfynol 104, 82, 465, 485, or TG (trade names) manufactured by Air Products and Chemicals Inc.

A commercial product may be used as the polysiloxane surfactant, examples of which include BYK-347 or BYK-348 (trade names) manufactured by BYK-Chemie Co., Ltd.

Furthermore, the ink composition may also contain an anionic surfactant, a nonionic surfactant, an amphoteric surfactant, or the like, as well as other surfactants. In addition, one type of the surfactant may be used in isolation, and two types or more may also be used together.

The content of the surfactant is not particularly limited, however, it is favorably from 0.1 to 1.0 mass % in relation to the total mass (100 mass %) of the ink composition.

Water-Soluble Organic Solvent (Wetting Agent)

In order to prevent clogging in the vicinity of the nozzle holes 17 of the head 31, the ink composition may also contain a water-soluble organic surfactant (wetting agent) which provides a wetting effect. The wetting agent is not particularly limited to the following examples, however, examples include multivalent alcohols such as 1,2-hexanediol, glycerin, 1,2,6-hexane triol, trimethylol propane, ethylene glycol, propylene glycol, butylene glycol, diethylene glycol, triethylene glycol, tetraethylene glycol, pentaethylene glycol, dipropylene glycol, 2-butene-1,4-diol, 2-ethyl-1,3-hexanediol, and 2-methyl-2,4-pentanediol, sugars such as glucose, mannose, fructose, ribose, xylose, arabinose, galactose, aldonic acid, glucitol (sorbitol) maltose, cellobiose, lactose, sucrose, trehalose, and maltotriose, so-called solid wetting agents such as sugar alcohols, hyaluronic acids, and ureas, alkyl alcohols having 1 to 4 carbon atoms such as ethanol, methanol, butanol, propanol, and isopropanol, so-called amino acids such as pyrrolidone carboxylic acid, aspartic acid, glycine, glycine, proline, and betaine, as well as 2-pyrrolidone, N-methyl-2-pyrrolidone, 1,3-dimethyl-2-imidazolidinone, formamide, acetamide, dimethyl sulfoxide, sorbitol, sorbitan, acetin, diacetin, triacetin, and sulfolane.

One type of the water-soluble organic solvent may be used in isolation, and two types or more may also be used together.

In addition, in order to secure suitable physical properties (viscosity and the like) of the ink composition as well as favorable print quality and reliability, the content of the water-soluble organic solvent is favorably from 5 to 30 mass % in relation to the total mass (100 mass %) of the ink composition.

Furthermore, it is preferable that the first ink contain 0.5 mass % or more of 1,2-hexanediol and that the second ink does not substantially contain 1,2-hexanediol. Including the 1,2-hexanediol solvent improves the ejection stability, however, although the reason is not clear, including it in the second ink causes an issue in that the glossiness decreases. Although the reason is not known, it is possible that 1,2-hexanediol influences the dispersibility of the resin particles in the second ink.

Aprotic Polar Solvent

It is preferable that the second ink composition not substantially contain an aprotic polar solvent. This is because the redispersibility of the resin contained in the second ink composition improves and the ejection stability is excellent due to the second ink composition not substantially containing an aprotic polar solvent. It is preferable to add an aprotic polar solvent to the first ink composition depending on the type of the medium to be recorded P. This is because, in particular, the adherence of the ink composition to the medium to be recorded P such as vinyl chloride is superior due to the first ink composition containing an aprotic polar solvent.

The aprotic polar solvent is not particularly limited to the following examples, however, it is preferable to select one type or more from a group formed from pyrrolidones, lactones, sulfoxides, imidazolidinones, sulfolanes, urea derivatives, dialkyl amides, cyclic ethers, glycol diethers, and amide ethers.

Specific examples of pyrrolidones include 2-pyrrolidone, N-methyl-2-pyrrolidone, and N-ethyl-2-pyrrolidone. Specific examples of lactones include γ-butyrolactone, γ-valerolactone, and ε-caprolactone. Specific examples of sulfoxides include dimethyl sulfoxide and tetramethylene sulfoxide. A specific example of an imidazolidinone is 1,3-dimethyl-2-imidazolidinone. Specific examples of sulfolanes include sulfolane and dimethyl sulfolane. Specific examples of ureas include dimethyl urea and 1,1,3,3-tetramethyl urea. Specific examples of dialkylamides include dimethylformamide and dimethylacetamide. Specific examples of cyclic ethers include 1,4-dioxane and tetrahydrofuran. A specific example of a glycol diether is diethylene glycol diethyl ether.

In addition, the solvent represented by the following General Formula is equivalent to the amide ether.

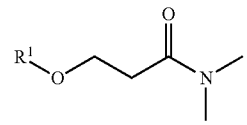

In the formula, it is appropriate for $R^1$ to be an alkyl group having from 1 to 4 carbon atoms. The "alkyl group having from 1 to 4 carbon atoms" may be a linear or a branched alkyl group, for example, may be a methyl group, an ethyl group, an n-propyl group, an iso-propyl group, an n-butyl group, an iso-butyl group, a sec-butyl group, or a tert-butyl group. The solvent represented by the formula in which $R^1$ is an alkyl group having from 1 to 4 carbon atoms can give an appropriate pseudoplasticity to the ink composition, and therefore it is possible to secure favorable ejection stability of the ink. In addition, the solvent represented by the formula in which $R^1$ is an alkyl group having from 1 to 4 carbon atoms is preferable particularly because the resin solvency action is strong.

The HLB value of the solvent represented by the formula is preferably from 10.5 to 20.0, and more preferably from 12.0 to 18.5. When the HLB value of the solvent represented by the formula is within the above range, this is even more favorable since an appropriate pseudoplasticity can be given to the ink, and due to the interaction with the resin component.

Furthermore, the HLB value of the solvent represented by the formula is a value calculated from the ratio between the nonpolar value (I) and the organic value (O) (hereinafter also simply referred to as the "I/O value") in an organic conceptual diagram.

$$HLB \text{ value}=(\text{nonpolar value}(I)/\text{organic value}(O))\times 10$$

Specifically, the I/O value may be calculated based on the respective documents "Systematic Organic Qualitative Analysis Mixtures" by Boku Fujita, published by Kazama bookstore, 1974, "Theoretical Chemistry of Dyeing" by Nobuhiko Kuroki, published by Maki bookstore, 1966, and "Organic Compound Separation Method" by Hiro Inoue, published by Shokabo Publishing, 1990.

In a case where the ink composition contains an aprotic polar solvent, since the favorable effect, in that the fixability in relation to the recording medium is improved, may be obtained, it is preferable to select one type or more from the group formed from pyrrolidones, lactones, sulfoxides, amides and ethers.

Water

The ink composition used in the ink jet recording method according to the embodiment described above preferably contains water as the main solvent. Examples of the water include ion-exchange water, ultrafiltered water, reverse osmosis water, pure water such as distilled water, or ultrapure water. Among these, water which has been sterilized using ultraviolet radiation, the addition of hydrogen peroxide, or the like is preferable since it prevents mold or bacteria from arising and makes long-term storage of the ink composition possible.

Other Additives

The ink composition according to the present embodiment may contain additives other than those described above (other additives). Examples of such additives include penetration enhancers such as pH modifiers, preservatives, fungicides, and glycol ethers, antioxidants, and the like.

The medium to be recorded P used in the ink jet recording method of the embodiment described above is a medium which is non-absorbent or poorly absorbent to ink to be recorded. The term "medium which is non-absorbent or poorly absorbent to ink to be recorded" refers to whether or not an ink reception layer (acceptance layer) is provided, or to a medium to be recorded provided with a reception layer not having enough thickness in order to sufficiently exhibit a function as a reception layer. More quantitatively, the term "medium which is non-absorbent or poorly absorbent to ink to be recorded" refers to a medium to be recorded in which the water absorption amount from the initiation of contact with the 30 msec$^{1/2}$ point is 10 mL/m$^2$ or less according to the Bristow method.

The details of the Bristow method are disclosed in the standard No. 51 "Paper and Cardboard—Liquid Absorbency Test Method—Bristow Method" of the "JAPAN TAPPI Paper Pulp Test Method 2000 Edition". The Bristow method is, to summarize, a method in which the wetting of a liquid to the surface of a medium to be recorded, and subsequently, the osmosis behavior of the liquid on the medium to be recorded are measured in a short time in millisecond units, and in which the liquid is dynamically moved from the head box to the test specimen above the rotating wheel and the absorption function Ka [unit: mL/m$^2$·(msec$^{1/2}$)] is obtained from the absorption time and transition amount.

The medium to be recorded P which is non-absorbent to ink is not limited to the following, however, examples thereof include a recording medium in which plastic is coated onto a substrate, such as a plastic film or paper, which has not undergone surface processing for ink jet recording, in other words does not have an ink reception layer, and a recording medium in which a plastic film is bonded onto a substrate, such as a plastic film or paper, which has not undergone surface processing for ink jet recording, in other words does not have an ink reception layer. The plastic is not limited to the following, however, examples thereof include polyvinyl chloride, polyethylene terephthalate, polycarbonate, polystyrene, polyurethane, polyethylene, and polypropylene.

The ink low-absorption medium to be recorded P is not limited to the following, however, examples thereof include coated paper, and printing paper such as fine coated paper, art paper, coated paper, matte paper, and cast paper.

Coated paper refers to paper in which a coating is coated on the surface to improve the aesthetics and the smoothness thereof. The coating may be prepared by mixing talc, pyrophyllite, clay (kaolin), titanium oxide, magnesium carbonate, and pigments such as calcium carbonate, and adhesives, such as starch and polyvinyl alcohol. The coating is coated using a coater during the manufacturing process of the paper. As the coater, there is an off-machine-type coater which performs paper making and coating as one process by being directly connected to a paper machine, and an on-machine-type coater which performs paper making as a separate process.

Fine coated paper refers to recording paper in which the coating amount of the coating is 12 g/m$^2$ or less.

Art paper refers to recording paper in which approximately 40 g/m$^2$ of coating is coated onto high quality paper (high grade recording paper). Coated paper refers to recording paper to which approximately 20 g/m$^2$ to 40 g/m$^2$ of coating is coated. Cast paper refers to recording paper which is finish coated to have superior metallic glossiness and smoothness by applying pressure to the surface of art paper or coated paper using a cast drum.

It is possible to provide an ink jet recording method with excellent glossiness and clogging stability of the head 31 by using the ink composition and the medium to be recorded P described above. More specifically, it is possible to obtain a coating film with excellent glossiness, and, to increase the ink application amount, since there is no concern that bleeding will occur.

Example 1

Hereinafter, further specific description will be given of the embodiments of the invention using examples, however, the embodiments described above are not limited to only these examples.

Color Materials Used

The materials used in the following examples, comparative examples, reference examples, and test examples are as follows.

Resin Emulsion

Mowinyl 972 (trade name, manufactured by Nippon Synthetic Chemical Co., 50% solids concentration)

Mowinyl 6530 (trade name, manufactured by Nippon Synthetic Chemical Industry, 44% solids concentration)

Mowinyl 742A (trade name, manufactured by Nippon Synthetic Chemical Co., 46% solids concentration)

VINYBLAN 2500E (trade name, manufactured by Nissin Chemical Co., 35% solids concentration)

Pigment

Carbon Black (hereinafter, also referred to as "K")

Pigment Blue 15:3 (hereinafter also referred to as, "C")

Pigment Red 122 (hereinafter also referred to as "M")

Pigment Yellow 155 (hereinafter also referred to as "Y")

Water-Soluble Organic Solvent 1,2 hexane diol 2-pyrrolidone (hereinafter also referred to as "2-P")

butylene glycol (hereinafter also referred to as "BG")

Surfactant

BYK-348 (trade name of BYK-Chemie Co., Ltd.)

Water pure water

Preparation of Pigment Dispersion

Here, the pigment was dispersed using the following method.

A solution of water-soluble resin was prepared by 40 parts by mass of the dispersion resin (as a water-soluble resin methacrylic acid/butyl acrylate/styrene/hydroxyethyl acrylate=a water-soluble resin copolymerized in a mass ratio of 25/50/15/10, weight-average molecular weight 12000) being introduced into a mixed liquor of 7 parts by mass of potassium hydroxide, 23 parts by mass of water, and 30 parts by mass of triethylene glycol-mono-n-butyl ether, and dissolved by heating and stirring at 80° C. 1.75 kg of this solution (43% solids) was mixed with 3.0 kg of each of the above pigments, ethylene glycol 1.5 kg, and 8.75 kg of water, then pre-mixing was performed using an agitator to mix the above. Dispersion of the pigment mixed liquor was performed using a multi-pass method by using a horizontal-type bead mill provided with a multi-disc-type impeller having 1.5 liters of effective volume and filled to 85% with 0.5 mm zirconium beads. Specifically, the pigment mixed liquor was obtained by performing two passes at a bead circumferential speed of 8 m/second with an ejection amount of 30 liters per hour.

Next, circulation dispersion was performed by using a horizontal-type annular-type bead mill having 1.5 liters of effective volume and filled to 95% with 0.05 mm zirconium beads. A pigment dispersion of 20% pigment solids was obtained by performing dispersion processing on 10 kg of pigment mixed liquor for 4 hours using a screen with a pore size of 0.015 mm, a bead circumferential speed of 10 m/second, and a circulation amount of 300 liters/hour.

Production of Ink Composition

The first ink composition (compositions 10 and 11) and the second ink composition (the clear ink composition) of composition 1 to composition 9 were produced by mixing each ingredient by the contents shown in FIG. 5, stirring them at room temperature for two hours, and then filtering using a membrane filter with a pore size of 5 μm. A plurality of colors of the first ink composition are prepared, however, they are the same composition except for the pigment being different (in other words, of compositions 10 and 11, since they are different by only the type of the pigment C, M, Y, and K, there are a total of 8 types of the first ink composition). Furthermore, the unit of content shown in FIG. 5 is mass %. In addition, the solids concentration of the resin in the clear ink composition is 7% in all of the colors. Furthermore, the term ink film formation temperature in FIG. 5 corresponds to the MFT of the resin contained in the clear ink composition. In addition, in the ink jet recording described below, film formation was performed on all of the clear ink compositions of each composition at the corresponding film formation temperatures in FIG. 5.

Here, the redispersibility due to the resin emulsion in each of the clear ink compositions represented by composition 1 to composition 8, in other words, the redispersibility due to the difference in the MFT of the resins have been evaluated, and the results thereof are shown in FIG. 6. After drying the respective ink compositions of composition 1 to composition 8 shown in FIG. 5 at 50° C. for an hour, the redispersibility thereof was evaluated by visually observing whether or not redispersion occurs when pure water was added. In FIG. 6, "O" represents that redispersion occurred, and "X" represents that redispersion did not occur.

When the ink composition has excellent redispersibility, the clogging stability of the head is superior due to the ink composition not adhering, in other words, the ink composition stably does not generate head clogging. From FIG. 6, it was understood that the redispersibility is excellent when the solvent (water-soluble organic solvent) is butyl glycole (BG), and, the clear ink composition is Mowinyl 972 or Mowinyl 6530 in which the MFT of the resin is 60° C. or higher.

Next, the characteristics of the recorded object due to the presence or absence of an aprotic polar solvent in the first ink composition, in other words, the color ink composition were evaluated. The compositions evaluated were the composition 10 and the composition 11, which are color ink compositions, shown in FIG. 5, where the composition 10 contained 2-pyrolidone which is an aprotic polar solvent, and the composition 11 did not. The color fastness to rubbing was evaluated as the evaluation item, and in the method of doing so, the recorded object after drying was set in a Gakushin-type color fastness to rubbing test machine AB-301 (trade name, manufactured by Tester Sangyo Co., Ltd.), rubbed 10 times using a friction block (load; 300 g) in which a white cotton cloth is attached to a contact portion (in accordance with JIS L 0803), and those in which the color ink had not transferred to the white cotton cloth were represented as an "O", and those in which it had not as an "X". The results are shown in Table 1.

TABLE 1

| | Evaluation of Color Fastness to Rubbing |
|---|---|
| Composition 10 | O |
| Composition 11 | X |

As shown in Table 1, the color ink composition of composition 10, which contains 2-pyrrolidine as an aprotic polar solvent in the color ink composition which is the first ink composition, obtained an evaluation of having a high color fastness to rubbing.

Next, the characteristics of the recorded object due to the presence or absence of 1,2-hexanediol, which is a 1,2-alkanediol having 4 to 6 carbon atoms, in the clear ink composition which is the second ink composition were evaluated.

The compositions evaluated were the composition 1 and the composition 9, which are the clear ink compositions, shown in FIG. 5, where the composition 9 contained 1,2-hexanediol, and the composition 1 did not. The glossiness was evaluated, and when the average of the 20° specular glossiness on each color of CMYK was 60 or greater, this was shown as "O", and when it was less than 60, this was shown as "X".

TABLE 2

| | Evaluation of Color Fastness to Rubbing |
|---|---|
| Composition 1 | O |
| Composition 9 | X |

As shown in Table 2, the clear ink composition of composition 1, which does not contain 1,2-hexanediol in the clear ink composition which is the second ink composition, obtained an evaluation of having a high glossiness.

From the above evaluation results, in the example shown below, composition 10 shown in FIG. 5 was used as the color ink composition of the first ink composition, and composition 1 and composition 2 were used as the clear ink composition of the second ink composition.

Test Example 1

Next, the recorded object was manufactured in the following manner using IJ40 (polyvinyl chloride) manufactured by 3M as the medium to be recorded, and the colored ink composition of composition 10, the clear ink composition of composition 2, as well as the ink jet recording method shown in FIG. 2.

First Recording Step

The first recording step was performed at the same time as performing the transporting operation to the Y1 direction. The image was formed by ejecting and landing the colored ink composition from the nozzles within the ink jet head toward the medium to be recorded. Furthermore, each of the conditions of the recording resolution was set to 720×1440 dpi, the number of scans to 10, the ejection weight per drop to 18 ng, and the duty to 100%.

First Drying Step

The first drying step was performed at the same time as the first recording step. The image was dried at 60° C. (the first temperature) using the drying heater 41 (infrared heater). At this time, the dryness factor was 85%. Furthermore, the dryness factor was calculated based on the mass at the time of the second recording step.

Furthermore, the air blower 43 which supplies cold air was used when drying the image using the drying heater 41.

Back-Feed Step

In the back-feed step, the medium to be recorded which had undergone the first drying step was transported in the Y1 direction until it was in front of the curing heater 42, after which the medium to be recorded P was transported in the Y2 direction.

Second Recording Step

In the second recording step, the image in which the clear ink composition is finish coated onto the image (the finishing coat image) was formed by ejecting the clear ink composition from the nozzle rows within the ink jet head (the same ink jet head as in the first recording step) toward the image having a dryness factor of 85%, and landing the clear ink composition thereon. Furthermore, each of the conditions of the recording resolution was set to 720×1440 dpi, the number of scans to 4, the ejection weight per drop to 18 ng, and the duty to from 0 to 200%.

Second Drying Step

The second drying step was performed after the second recording step. The finishing coat image was dried at 100° C. (the third temperature) using the curing heater 42 (infrared heater) and was fixed onto the medium to be recorded. In this manner, the recorded object was obtained.

Test Examples 2 and 3

The compositions disclosed in the following Table 3 were adopted as the colored ink composition and the clear ink composition, and the recorded object was obtained in the same manner as in Test Example 1 except for that the dryness factor was set to the values disclosed in Table 3.

Evaluation of the glossiness of the obtained recorded object was performed.

The 20° specular glossiness of the recorded object was measured in accordance with JIS Z8741:1997 using a gloss meter (manufactured by Nippon Denshoku Industries, trade name "GlossMeter model number VGP 5000"). In addition, in the recording method of Test Example 2, the colored ink composition and the clear ink composition were applied in order using the divided application of the nozzle rows, and, in the recording method of Test Example 3, the colored ink composition and the clear ink composition were applied to the same location during the same scan.

TABLE 3

| | Test Example 1 | Test Example 2 | Test Example 3 |
|---|---|---|---|
| Color Ink | Composition 10, Black | Composition 10, Black | Composition 10, Black |
| Dryness factor | 85% | 50% | 25% |
| Clear Ink | Composition 2 | Composition 2 | Composition 2 |
| Glossiness | 40.9 | 25.2 | 10.1 |

Example 2

Next, the recorded object was manufactured in the following manner using IJ40 (polyvinyl chloride) manufactured by 3M as the medium to be recorded, and the colored ink composition of composition 10, the clear ink composition of composition 2, as well as the ink jet recording method shown in FIG. 2.

First Recording Step

The first recording step was performed at the same time as performing the transporting operation to the Y1 direction. The image was formed by ejecting and landing the colored ink composition from the nozzle holes within the ink jet head toward the medium to be recorded. Furthermore, each of the conditions of the recording resolution was set to 720×1440 dpi, the number of scans to 10, the ejection weight per drop to 18 ng, and the duty to 100%.

First Drying Step

The first drying step was performed at the same time as the first recording step. The image was dried at 60° C. using the drying heater 41 (infrared heater). At this time, the dryness factor was 85%. Furthermore, the dryness factor was calculated based on the mass at the time of the second recording step. In addition, the air blower 43 which supplies cold air was used when drying the image using the drying heater 41.

Back-Feed Step

In the back-feed step, the medium to be recorded which had undergone the first drying step was transported in the Y1 direction until it was in front of the curing heater 42, after which the medium to be recorded P was transported in the Y2 direction.

Second Recording Step

In the second recording step, the image in which the clear ink composition is finish coated onto the image (the finishing coat image) was formed by ejecting the clear ink composition from the nozzle rows within the ink jet head (the same ink jet head as in the first recording step) toward the image having a dryness factor of 85%, and landing the clear ink composition thereon. Furthermore, the ejection method of the clear ink composition in the second recording step will be shown in the drawings. The method 1 in FIG. 7 is a method of coating one layer of the clear ink composition at one time, and coating two layers using two time coating. The method 2 is a method of coating two layers of the clear ink composition at one time. Further, the method 3 is a method of coating one layer of the clear ink composition at one time.

Second Drying Step

The image was dried at 60° C. (the first temperature) using the drying heater 41 (infrared heater). At this time, the dryness factor was 85%. Furthermore, the dryness factor was calculated based on the mass at the time of the second recording step. In addition, the air blower 43 which supplies cold air was used when drying the image using the drying heater 41.

Third Drying Step

The third drying step was performed after the second drying step. The finishing coat image was dried at 100° C. (the second temperature) using the curing heater 42 (infrared heater) and was fixed onto the medium to be recorded. In this manner, the recorded object was obtained. Furthermore, in the coating method shown in FIG. 7, in the method 1, the second drying step was performed for each layer and per one time coating was performed, and the third drying step was executed after the second performance of the second drying step.

The evaluation of the glossiness of the recorded object obtained in the steps described above based on the recording method shown in FIG. 8 using the composition 1 and the composition 2 shown in FIG. 5 as the clear ink composition and the composition 10 shown in FIG. 5 as the color ink composition. In the evaluation method of the glossiness, the 20° specular glossiness of the recorded object was measured in accordance with JIS Z 8741:1997 using a gloss meter (manufactured by Nippon Denshoku Industries, trade name "GlossMeter model number VGP 5000").

Furthermore, for comparison with examples 1 to 4, a system in which the clear ink composition is not finish coated was used as a test example. The results of the (20°) glossiness of the examples 1 to 4 and the test example 4 are shown in FIG. 8.

In addition, the results of the (20°) glossiness of the examples 2 to 4 and the test example 4 are shown in FIG. 9. Furthermore, in the following table 5, the term "CMP" corresponds to the black image produced using a cyan ink (C), a magenta ink (M), and a yellow ink (Y).

From FIG. 8 and FIG. 9, the glossiness of example 1 and example 2 is excellent, and, in particular, the glossiness of example 1 is excellent. In other words, the two layer two time coating of the method 1 shown in FIG. 7 can obtain a superior glossiness to the two layer one time coating of the method 2, or the one layer one coating of the method 3. Furthermore, even in the coating method of the method 1, the clear ink composition as the second ink composition obtained a result in which the composition 2 shown in FIG. 5 obtained superior glossiness to the composition 1.

What is claimed is:

1. An ink jet recording method using at least a first ink composition containing a color material and a second ink composition containing a resin as well as substantially not containing a color material, the method comprising:
    a first recording step of forming an image by recording the first ink composition onto a medium to be recorded which is non-absorbent or poorly absorbent to ink using an ink jet head;
    a second recording step of recording the second ink composition onto the image using the ink jet head;
    a second drying step of drying the image at a first temperature, which is performed during execution of the second recording step or after the second recording step; and
    a third drying step of drying the image at a second temperature which exceeds the first temperature, and is performed after the second drying step,
    wherein, the second ink composition does not substantially contain an aprotic polar solvent, and the heat deformation temperature of the resin exceeds the first temperature and is lower than the second temperature.

2. The ink jet recording method according to claim 1, wherein the first ink composition contains 1 mass % or more of an aprotic polar solvent.

3. The ink jet recording method according to claim 1, wherein the first ink composition contains 0.5 mass % or more of 1,2-hexanediol, and the second ink composition does not substantially contain 1,2-hexanediol.

4. The ink jet recording method according to claim 1, wherein the resin is one or more types selected from an acrylic resin, a urethane resin, a polyester resin, and a styrene-acrylic resin.

5. The ink jet recording method according to claim 1, further comprising: a first drying step of drying the image at a first temperature performed during execution of the first recording step or before the second recording step, wherein the dryness factor of the image formed by the first recording step before the second recording step is 60% or higher.

6. The ink jet recording method according to claim 1, wherein the second recording step includes a step of recording the second ink composition onto the image formed using the first recording step and re-recording the second ink composition after the second ink composition has dried on the medium to be recorded.

7. The ink jet recording method according to claim 1, wherein the ink jet head used in the first recording step is provided with nozzle rows formed from a plurality of nozzle holes, and scans in a main scanning direction through a scanning mechanism;
    the nozzle rows include a first nozzle row in which a plurality of the nozzle holes for ejecting the first ink composition are arranged in a sub-scanning direction intersecting the main scanning direction, and a second nozzle row in which a plurality of the nozzle holes for ejecting an undercoat ink composition which records an undercoat layer of the image are arranged in the sub-scanning direction; and
    the first recording step uses the first nozzle row and the second nozzle row divided in the sub-scanning direction into groups which respectively include a predetermined number of the nozzle holes, records the undercoat ink composition using a first group in an upstream side in the sub-scanning direction, and, records the first ink composition using a second group further to a downstream side in the sub-scanning direction than the first group.

8. A recording apparatus, wherein an image is formed on the medium to be recorded using the ink jet recording method according to claim 1.

9. A recording apparatus, wherein an image is formed on the medium to be recorded using the ink jet recording method according to claim 2.

10. A recording apparatus, wherein an image is formed on the medium to be recorded using the ink jet recording method according to claim 3.

11. A recording apparatus, wherein an image is formed on the medium to be recorded using the ink jet recording method according to claim 4.

12. A recording apparatus, wherein an image is formed on the medium to be recorded using the ink jet recording method according to claim 5.

13. A recording apparatus, wherein an image is formed on the medium to be recorded using the ink jet recording method according to claim 6.

14. A recording apparatus, wherein an image is formed on the medium to be recorded using the ink jet recording method according to claim 7.

15. The ink jet recording method according to claim 1, wherein the second drying step of drying the image at the first temperature is performed during execution of the second recording step.

* * * * *